US006259567B1

(12) United States Patent
Brown et al.

(10) Patent No.: US 6,259,567 B1
(45) Date of Patent: Jul. 10, 2001

(54) MICROLENS STRUCTURE HAVING TWO ANAMORPHIC SURFACES ON OPPOSING ENDS OF A SINGLE HIGH INDEX SUBSTANCES AND METHOD OF FABRICATING THE SAME

(75) Inventors: Jeremiah D. Brown; Daniel M. Brown, both of Madison, AL (US)

(73) Assignee: Mems Optical Inc., Huntsville, AL (US)

( * ) Notice: Subject to any disclaimer, the term of this patent is extended or adjusted under 35 U.S.C. 154(b) by 0 days.

(21) Appl. No.: 09/197,579

(22) Filed: Nov. 23, 1998

(51) Int. Cl.[7] .................................................... G02B 13/08
(52) U.S. Cl. .......................... 359/668; 359/670; 264/1.7
(58) Field of Search ................................. 359/668, 670, 359/669; 264/1.7, 2.4, 2.7

(56) References Cited

U.S. PATENT DOCUMENTS

| 4,684,222 | | 8/1987 | Borrelli et al. | 350/420 |
|---|---|---|---|---|
| 4,915,484 | * | 4/1990 | Yamamoto | 350/420 |
| 5,181,224 | | 1/1993 | Snyder | 372/101 |
| 5,463,498 | * | 10/1995 | Gal et al. | 359/622 |
| 5,467,335 | | 11/1995 | Braat | 369/100 |
| 5,482,800 | | 1/1996 | Gal | 430/5 |
| 5,572,288 | | 11/1996 | Mizutani | 355/53 |
| 5,785,651 | * | 7/1998 | Kuhn et al. | 600/310 |
| 5,790,576 | | 8/1998 | Waarts et al. | 372/43 |
| 5,875,056 | * | 2/1999 | Takahashi | 359/633 |
| 5,916,402 | * | 6/1999 | Takano et al. | 156/242 |
| 6,071,652 | * | 6/2000 | Feldman et al. | 430/5 |
| 6,072,620 | * | 6/2000 | Shiono et al. | 359/290 |
| 6,157,502 | | 12/2000 | Kathman | 359/819 |

FOREIGN PATENT DOCUMENTS 0864892   9/1998   (EP).

OTHER PUBLICATIONS

Connely S.W. et al.: "Diffraction Limited Virtual Point Source Microlenses" Proceedings of the SPIE, 1995, XP000861745.

Liau Z. L. et al.: "Fabrication of Two–Sided Anamorphic Microlenses and Direct Coupling of Tapered High–Power Diode Laser to Single–Mode Fiber" IEEE Photonics Technology Letters, US, IEEE Inc. New York, vol. 7, No. 11, Nov. 1, 1995, pp. 1315–1317, XP000537966 ISSN: 1041–1135.

Braat J.: "Design of Beam–Shaping Optics" Applied Optics, US, Optical Society of America, Washington, vol. 34, No. 15, May 20, 1995, pp. 2665–2670, XP000505276, ISSN: 0003–6935.

* cited by examiner

Primary Examiner—Georgia Epps
Assistant Examiner—Tim Thompson

(57) ABSTRACT

A structure and method for circularizing and collimating incident light involves a substrate having first and second opposing surfaces, a first anamorphic surface positioned on the first surface and a second anamorphic microlens positioned on the second surface, the first and second surfaces being separated by a distance defined by the distance required for the first anamorphic microlens to circularize the incident light. A single microlens structure used to circularize and collimate incident light is manufactured by identifying aligned portions on opposing surfaces of a substrate, and forming microlenses on each of the aligned portions of the opposing substrate surfaces identified. The microlenses formed on the opposing substrate surfaces are fabricated from a high-index material such as GaP.

24 Claims, 16 Drawing Sheets

ASTIGMATISM

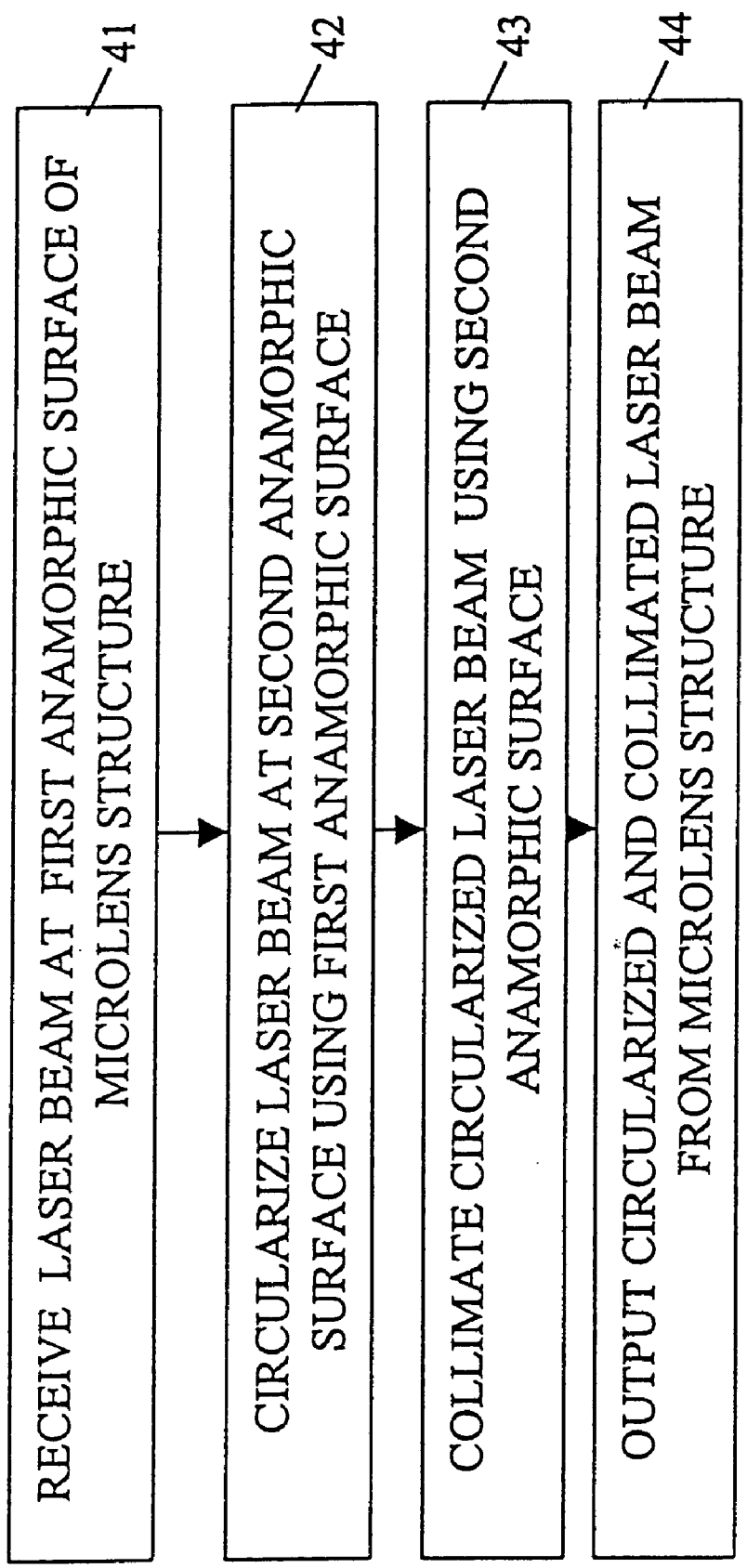

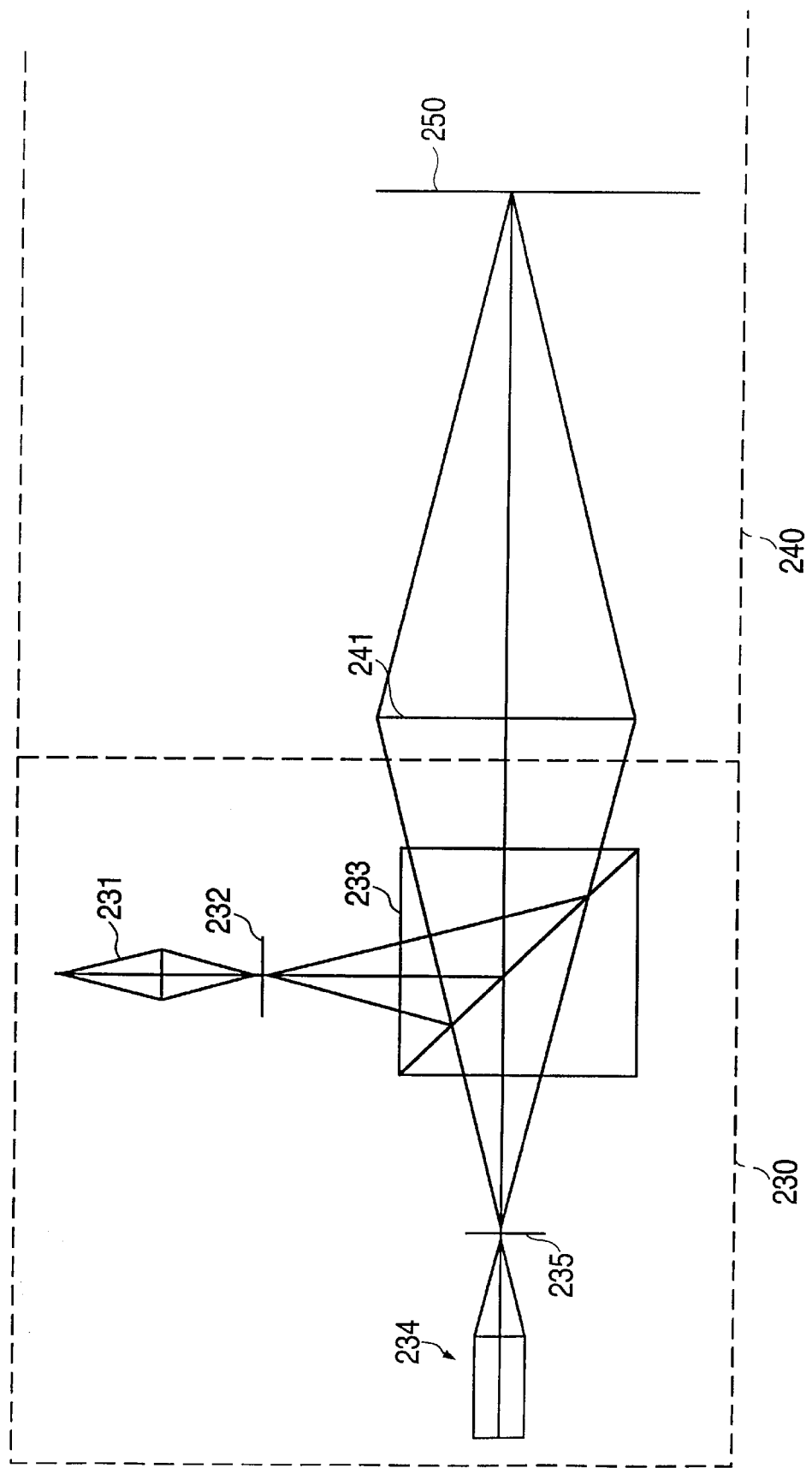

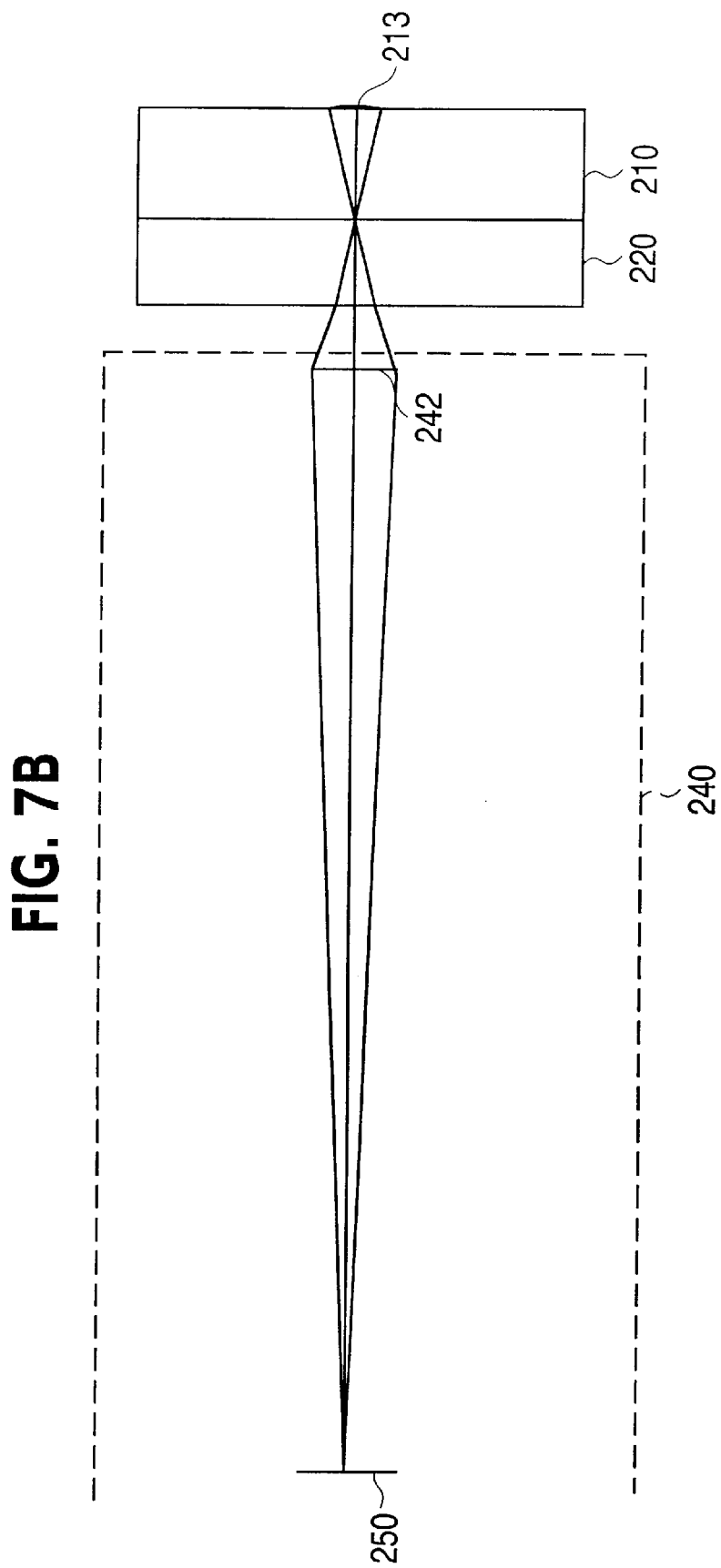

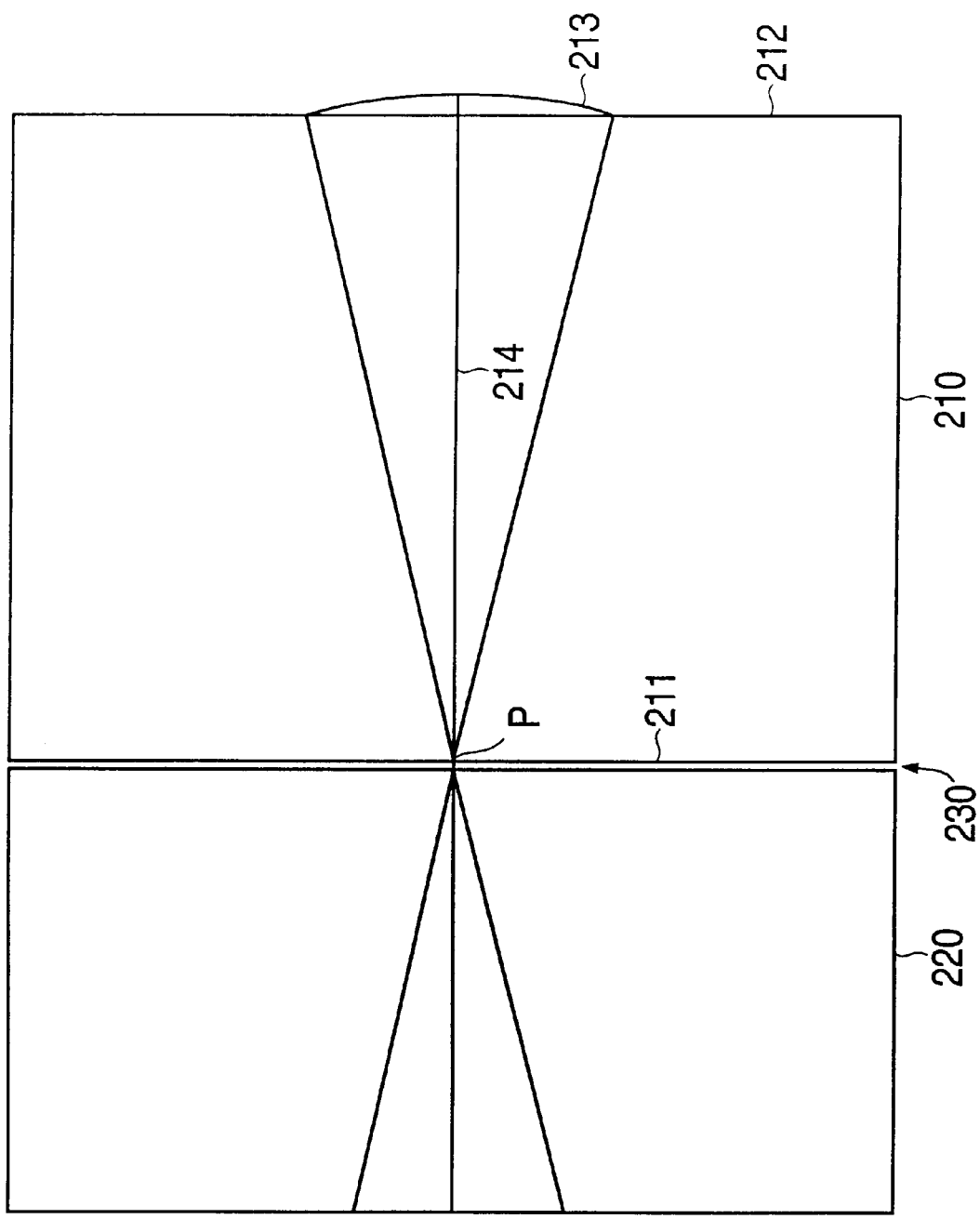

MICROLENS STRUCTURE HAVING TWO ANAMORPHIC SURFACES ON OPPOSING ENDS OF A SINGLE HIGH INDEX SUBSTANCES AND METHOD OF FABRICATING THE SAME

BACKGROUND OF THE INVENTION

1. Field of the Invention

The present invention relates to a microlens structure and fabrication method thereof. More particularly, the present invention relates to a microlens structures formed in high index materials using photolithography, gray scale masks, and reaction ion etching, the structures generally having two anamorphic surfaces on opposing ends of a single substrate, and fabrication methods thereof.

2. Discussion of Conventional Art

FIGS. 1A–1B and 1C–1D respectively illustrate a laser beam 1 output from an ideal laser beam diode (hereinafter, an ideal laser beam), and a laser beam 2 output from a laser diode. As shown in FIGS. 1A–1B, an ideal laser beam is a highly collimated, circular beam, with a gaussian intensity profile. By contrast, as shown in FIGS. 1C–1D, a laser beam generated by a laser diode is a non-collimated, elliptical aberrations. As such, the laser beam generated by a laser diode diverges by different amounts in orthogonal planes. To generate a laser beam having characteristics more closely resembling the characteristics of an ideal laser beam, the output of a laser diode must therefore be circularized (e.g., changed from its elliptical shape to a circular shape) and collimated. However, conventional systems for collimating and circularizing laser diode outputs experience at least three types of problems.

First, conventional systems require multiple separate elements. Specifically, conventional systems use a combination of two or more separate simple anamorphic elements such as prisms and cylindrical elements, combined with rotationally symmetric elements, to perform circularization and collimation of laser beams. For instance, as shown in FIG. 2, a conventional laser assembly includes a laser diode 21 followed by a three-part collimating lens 22, a cylindrical lens 23, and multiple anamorphic prisms 24. Therefore, because conventional systems require several different anamorphic elements, they are expensive to manufacture and difficult to align.

Second, simple diffractive systems cannot provide the high optical powers required for collimating widely divergent laser beams, such as those generated by laser diodes. For instance, although diffractive optics are capable of achieving non-symmetric (anamorphic) beam shaping, their usefulness in correcting laser diodes is limited by fabrication constraints. Specifically, diffractive zone widths of less than approximately three (3) microns are required in order to collimate the wide divergence angles that are characteristic of laser beams generated by laser diodes. Yet, it is nearly impossible to fabricate diffractive optics with zone widths this small using conventional fabrication techniques including gray scale mask technology.

Third, simple refractive optics having anamorphic surface profiles suitable for collimating laser diode outputs are difficult to produce reliably. That is, although refractive optics typically achieve the optical powers required for collimation of a laser beam output, it is difficult to manufacture refractive optics with general anamorphic surfaces, i.e. different curvatures in orthogonal planes. One conventional method of manufacturing anamorphic refractive elements is to melt and stretch optical fibers. However, melting and stretching an optical fiber in this manner causes the design and fabrication process to become highly empirical and sensitive to numerous coupled process parameters (e.g., temperature and temperature distribution, fiber diameter, glass type, stress and strain, etc.). Another problem is that the resulting microlens is typically so small that alignment with the laser diode becomes very difficult.

Larger diameter refractive elements may be used to avoid alignment problems inherent in the melting and stretching process described above. Rather than melting and stretching, the surface of these elements may be shaped using conventional grinding and polishing techniques. However, when the conventional method of grinding and polishing is used to achieve a desired surface shape for the surface of refractive elements, the shape of those surfaces is limited to rotationally symmetric or simple cylindrical surface profiles. Arbitrary anamorphic surface profiles, such as saddle shapes, which are useful in collimating laser diode outputs, are therefore difficult to achieve with conventional grinding and polishing techniques.

New state-of-the-art diamond turning machines are capable of achieving bilaterally symmetric anamorphic profiles, but these are generally used for fabricating plastic molding tooling, not optical elements. Furthermore, diamond turning generates a fine periodic groove structure which must be removed with a post-polishing process to prevent scattering in the visible spectrum.

Moreover, conventional systems for collimating and circularizing laser diode outputs are problematic in at least three respects. First, conventional systems require multiple separate elements. Second, due to limitations and diffractive zone widths, conventional diffractive optics are not particularly well-suited for collimating laser diode outputs. Third, refractive optics having anamorphic surface profiles suitable for collimating laser diode outputs are difficult to reliably produce.

SUMMARY OF THE INVENTION

The present invention is directed towards a microlens structure and method of fabricating the same that substantially obviates one or more of the problems experienced due to the above and other limitations and disadvantages of the related art.

Accordingly, an object of the present invention is to reduce manufacturing costs and eliminate alignment problems associated with optics used to collimate and circularize a laser diode beam such as that output by a laser diode.

Another object of the present invention is to manufacture at least one of the opposing anamorphic surfaces of a microlens structure with a high index material.

Yet another object of the present invention is to manufacture an anamorphic surface of a microlens structure using a photolithographic process coupled with reactive ion etching or ion milling to eliminate manufacturing difficulties conventionally experienced.

Other and further objects, features and advantages of the present invention will be set forth in the description that follows, and in part will become apparent from the detailed description, or may be learned by practice of the invention.

To achieve these and other advantages, and in accordance with the purpose of the present invention as embodied and broadly described herein, the present invention includes a single microlens structure for circularizing and collimating incident light that includes a substrate having first and second opposing surfaces, a first anamorphic microlens positioned on one opposing surface and a second anamorphic microlens positioned on another of the opposing surfaces. The first microlens circularizes the light, while the second microlens collimates the light. The first and second surfaces are separated by a distance defined by the distance required for the first microlens to circularize incident light so that light passing through the first microlens is circularized at the second microlens. The first and second microlenses are preferably fabricated from a high index material such as GaP, $TiO_2$, $SrTiO_3$, Si, Ge, ZnSe, ZnS, InSb, InAs, YSZ, AlAs, $BaTiO_3$, AlN, BN, $CuGaS_2$, $BiSiO_{20}$, $Bi_{12}GeO_{20}$, AgCl, AgBr, AgI, $AgGaSe_2$, $AgGaS_2$, $Al_2O_3$, $LiTaO_3$, $KnbO_3$, KRS-5 (TlI), KRS-6 (TlCl), and TlBr, and the incident light is preferably a laser beam. The single microlens structure may be a component in a device used to generate circularized and collimated light, such a device also including a laser diode for generating a laser beam that is circularized and collimated after passing through both of the anamorphic microlenses formed on opposing surfaces of the single microlens structure.

In addition, the present invention may include a method of circularizing and collimating incident light passing through a single microlens structure which involves circularizing light passing through the first surface of the single microlens structure, and collimating light passing through the second surface of the microlens structure after being passed through the first surface. Furthermore, the present invention includes a method of manufacturing the single microlens structure, which includes identifying aligned portions on opposing surfaces of a substrate, and forming microlenses on each of the aligned portions of the opposing substrate surfaces identified. To identify aligned portions on opposing surfaces of a substrate, a first image is focused on a first position of a first substrate surface, and a determination is made whether the first position is aligned with a second position on an opposing substrate surface based on a second image formed from light emanating from a microoptical device that is located on the second substrate surface. To form the microlenses on each of the aligned portions of the opposing substrate surfaces identified, reactive ion etching may be performed using at least one gray scale mask.

It is to be understood that both the foregoing general description and following detailed description are exemplary and explanatory, and that those descriptions are intended to provide further explanation of the invention as claimed. Thus, it should be understood that the detailed description and specific examples, while indicating preferred embodiments of the invention, are given by way of example only. Various changes and modifications that are within the spirit and scope of the invention will become apparent to those skilled in the art from this detailed description. In fact, other objects, features, and characteristics of the present invention; methods, operation, and functions of the related elements of the structure; combinations of parts; and economies of manufacture will surely become apparent from the foregoing detailed description of the preferred embodiments and accompanying drawings, all of which form a part of the specification.

BRIEF DESCRIPTION OF THE DRAWINGS

The present invention will become more fully understood from the detailed description given hereinbelow and the accompanying drawings, which are given by way of illustration only, and thus should not limit the scope of the present invention, and wherein:

FIG. 4 is a flowchart describing an exemplary process performed by the present invention to transform a laser beam incident on the first anamorphic surface of the microlens structure shown in FIG. 3A;

FIGS. 7A–7C illustrate a second system for identifying portions of opposing surfaces of a substrate that are aligned;

DETAILED DESCRIPTION OF THE PREFERRED EMBODIMENTS

Figure 1A:
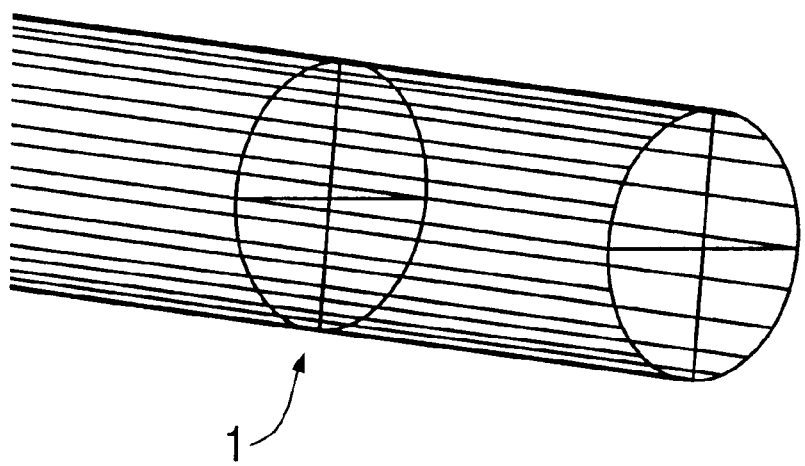
FIGS. 1A and 1B illustrate an ideal laser beam output, FIG. 1A illustrating characteristics of a collimated beam and FIG. 1B illustrating characteristics of a circular beam profile.
Figure 1B:
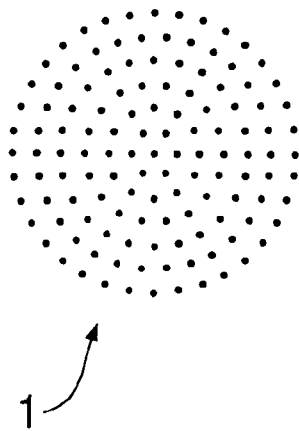
Figure 1C:
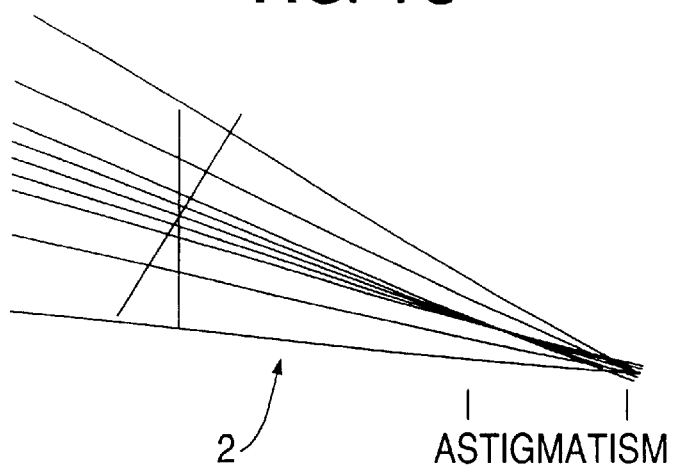
FIGS. 1C–1D illustrate a laser beam output from a laser diode, FIG. 1C illustrating the effects of an astigmatism introduced by the laser diode, and FIG. 1D illustrating a spot diagram at a distance of approximately 5 mm from the emitter of a laser diode.
Figure 1D:
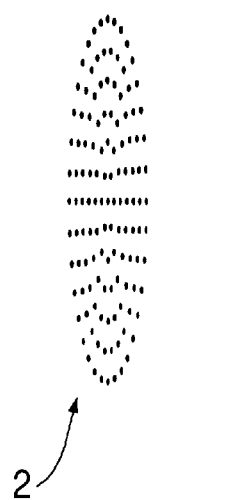
Figure 2:
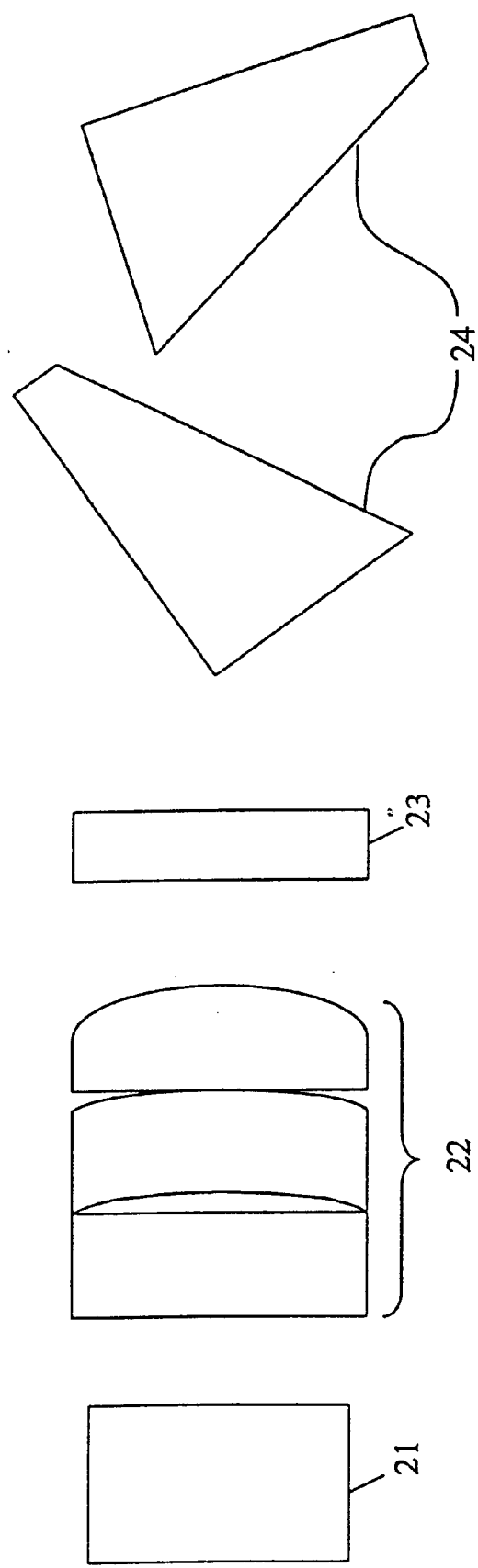
FIG. 2 illustrates a conventional corrected laser diode assembly including two or more separate anamorphic elements combined with rotationally symmetric elements.
Figure 3A:
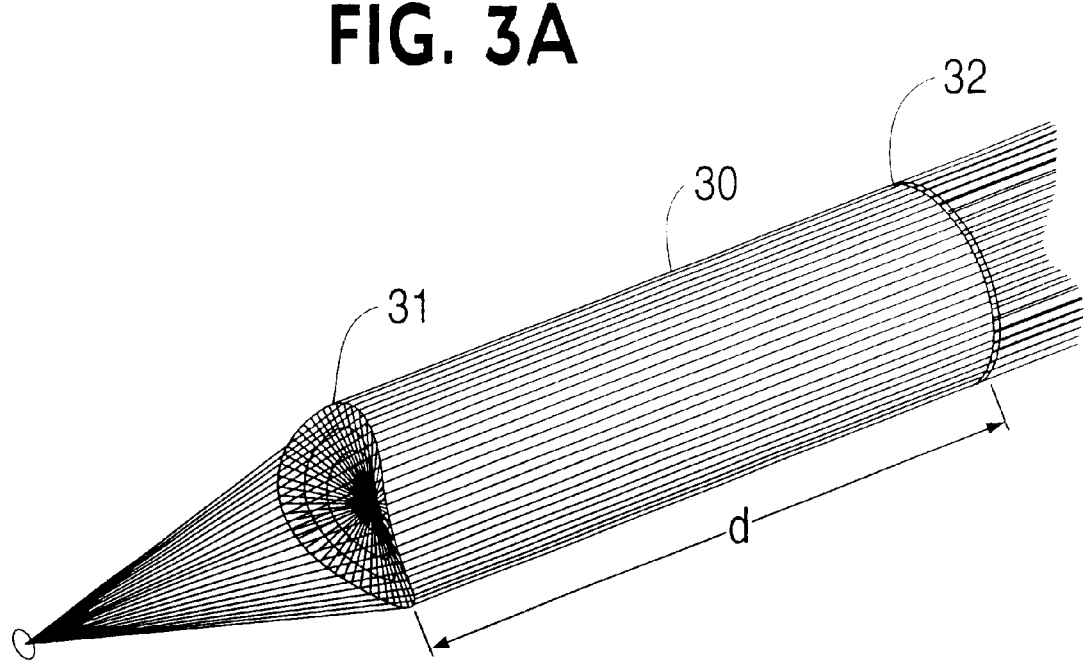
FIG. 3A shows an example of a microlens structure according to a preferred embodiment of the present invention.

Detailed reference will now be made to the preferred embodiments of the present invention, examples of which are illustrated in the accompanying drawings. In the drawings, redundant description of like elements and processes, which are designated with like reference numerals, is omitted for brevity. FIG. 3A illustrates an exemplary microlens structure according to a preferred embodiment of the present invention. The microlens structure includes a single substrate 30 having two anamorphic surfaces 31 and 32 respectively formed on opposing ends thereof.

Figure 3B:
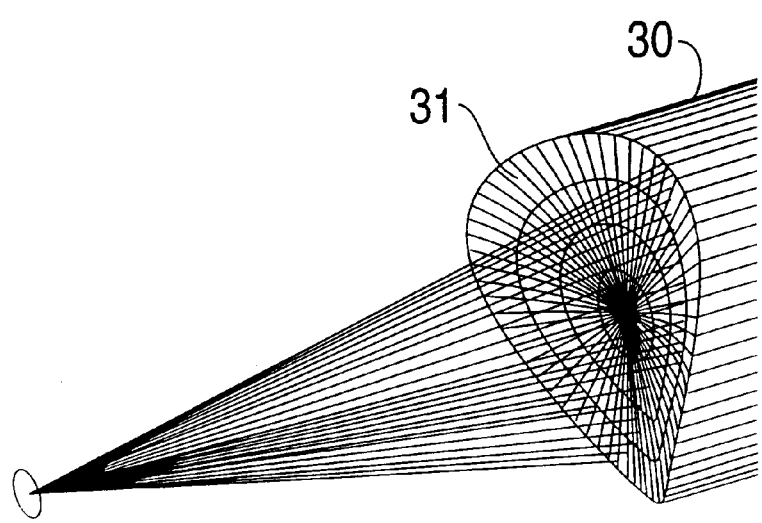
FIG. 3B shows an example of the curvature of a first anamorphic surface of the microlens structure shown in FIG. 3A.

The first anamorphic surface 31 has different optical powers in two orthogonal directions for circularizing incident laser beams. The shape of the first anamorphic surface 31 depends upon both the intensity distribution and phase (or divergence) of the incident laser beam to be circularized. For example, the intensity distribution through a cross section of a laser beam output by a laser diode is generally elliptical in shape. Therefore, first anamorphic surface 31 would be designed with a saddle shape to circularize the laser diode output, surface 31 having a negative lens power in one direction and a positive lens power in the other, as shown in FIG. 3B. This changes the divergence in such a way as to make the beam circular at the second surface.

The second anamorphic surface 32 is a collimating lens formed on the microlens structure 30. As such, second anamorphic surface 32 is used to remove the unequal divergences and flatten the phase of the incident laser beam, thereby collimating the laser beam. Like the first anamorphic surface 31, the shape of the second anamorphic surface 32 depends upon the laser beam to be collimated. However, unlike the first anamorphic surface 31 which is shaped to circularize the intensity distribution of the incident laser beam, the second anamorphic surface 32 is shaped to flatten the phase of the incident laser beam. For example, the laser beam incident on the second surface is circular at that point, but would return to an elliptical shape beyond this point due to the generally different divergences in orthogonal directions. To maintain a circular intensity distribution as the beam propagates beyond this point, the divergences (or phase) in orthogonal directions need to be made equal. To collimate the laser diode output (flatten the phase), the second anamorphic surface 32 would be designed as shown in FIG. 3C.

Figure 3C:
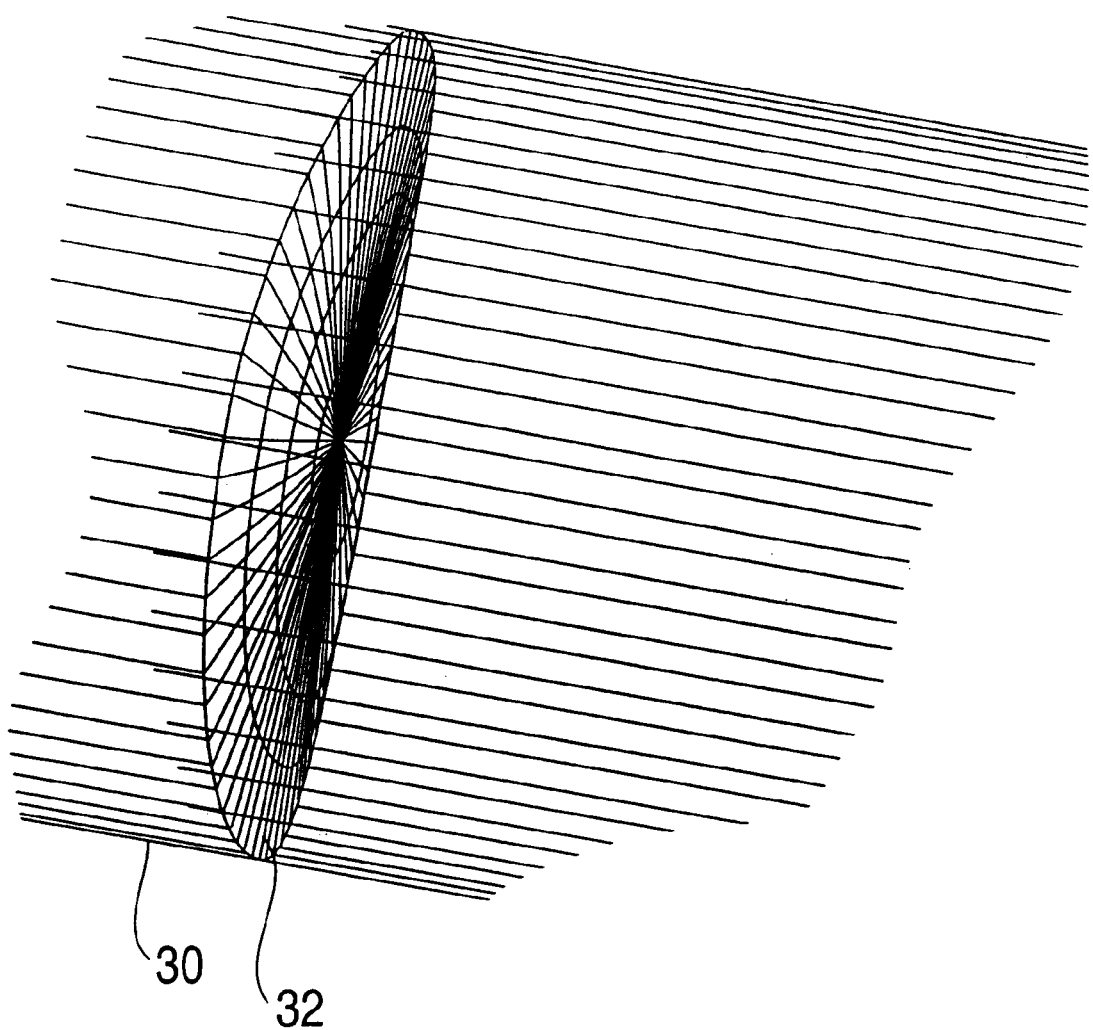
FIG. 3C shows an example of the curvature of a second anamorphic surface of the microlens structure shown in FIG. 3A.

As described, FIGS. 3B and 3C show examples of first and second anamorphic surfaces 31 and 32 of the microlens structure when designed to circularize and collimate a laser beam incident from a laser diode. Those of ordinary skill would readily appreciate that surface shapes other than those shown in FIGS. 3B and 3C may be appropriate for circularizing and collimating an incident laser beam depending upon the characteristics of the laser beam for which the microlens structure is designed to circularize and collimate.

The length of the substrate 30, which defines the distance d separating the first and second anamorphic surfaces 31 and 32, depends upon the distance required for the first anamorphic surface 31 to circularize an incident laser beam. Thus, an incident laser beam will be circularized by surface 31 at surface 32.

The substrate 30 upon which the first and second anamorphic surfaces 31 and 32 are formed preferably consists of a high-index material such as GaP, $TiO_2$, $SrTiO_3$, Si, Ge, ZnSe, ZnS, InSb, InAs, YSZ, AlAs, $BaTiO_3$, AlN, BN, $CuGaS_2$, $BiSiO_{20}$, $Bi_{12}GeO_{20}$, AgCl, AgBr, AgI, $AgGaSe_2$, $AgGaS_2$, $Al_2O_3$, $LiTaO_3$, $KnbO_3$, KRS-5 (TlI), KRS-6 (TlCl), TlBr, etc. Alternatively, it is possible to merely coat the ends of a substrate with a high-index material to achieve the structure shown, resulting in a less expensive microlens structure. As discussed in more detail below, the use of such high index materials enhances manufacturability while enabling laser beam circularization and collimation.

Using the microlens structure described with respect to FIGS. 3A–3C, a laser beam incident from a laser diode upon the first anamorphic surface 31 is transformed according to the steps shown in FIG. 4. In step 41, the elliptical laser beam LB generated by the laser diode LD is incident on the microlens structure 30. In step 42, the first anamorphic surface 31 changes the elliptical shape of the incident laser beam into a circular shape at the second anamorphic surface 32. Thereafter, to prevent unequal divergences from changing the circular shape back into an elliptical shape, second anamorphic surface 32 collimates the incident circularized laser beam. Through this process; the microlens structure of the present invention is used to produce an output laser beam that is circular and collimated from a laser diode output. However, those of ordinary skill could apply the same principle to achieve circularization and collimation of laser beams incident from sources other than a laser diode, which may have noncircular intensity distributions.

Figure 5:
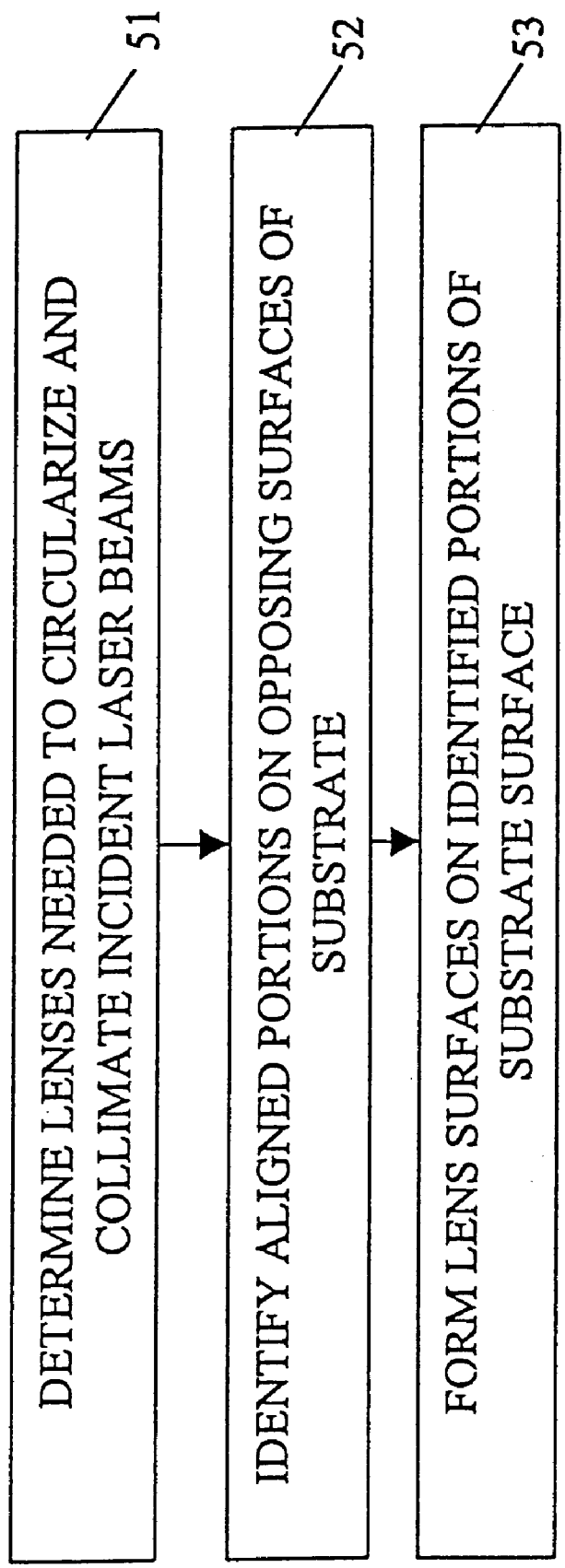
FIG. 5 shows a flowchart of an exemplary process performed by the present invention to manufacture the microlens structure shown in FIGS. 3A–3C.

When manufacturing the microlens structure of the present invention, gray scale mask and deep reactive ion etching (RIE) techniques are generally applied to achieve the anamorphic surface shapes required. More specifically, FIGS. 5 shows a flowchart of exemplary steps involved in manufacturing the microlens structure of the present invention.

In step 51, the lens surface shapes needed to circularize and collimate the incident laser beam are determined based on the distribution of an anticipated incident laser beam using well-known methods. For instance, if the anticipated incident laser beams have an elliptical distribution, like the laser beam produced by a conventional laser diode, lens shapes shown in FIGS. 3B and 3C may be deemed necessary to circularize and collimate the incident laser beams in step 51. Subsequently, aligned portions of opposing surfaces on a single substrate are identified in step 52, and the lens surfaces determined in step 51 are formed on the identified portions of the opposing substrate surfaces in step 53.

Various processes may be performed to identify aligned portions of opposing surfaces of a single substrate. A first such process for performing such identification is described below with reference to FIGS. 6A–6B, a second process being described with references to FIGS. 7A–10.

Figure 6A:
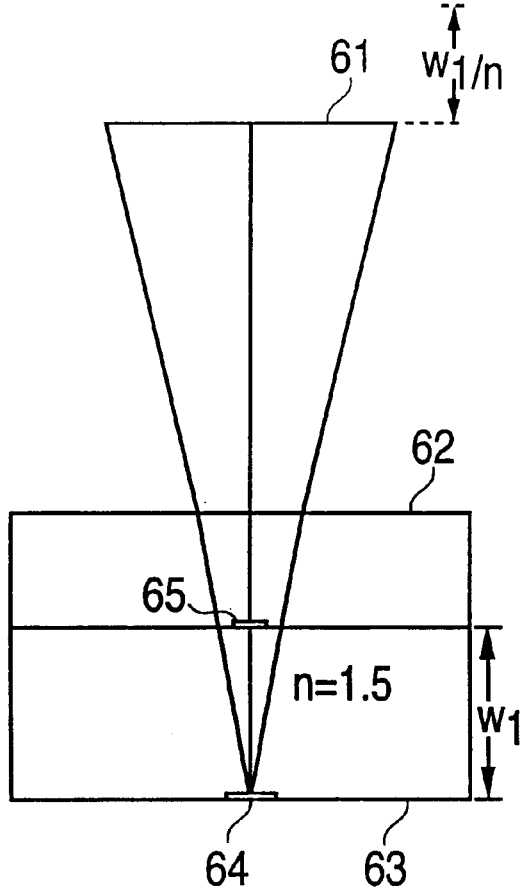
FIGS. 6A and 6B illustrate a first system for identifying portions on opposing surfaces of a substrate that are aligned.
Figure 6B:
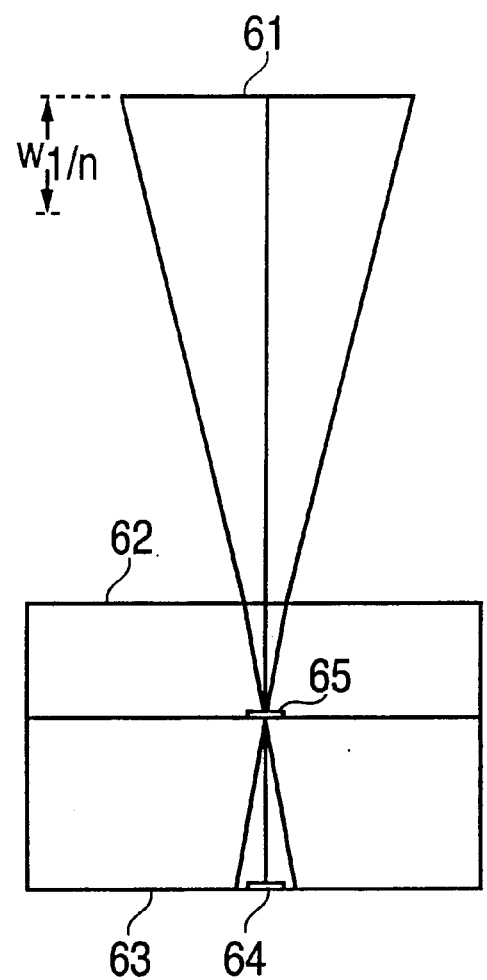

FIGS. 6A–6B illustrate how a first mask aligner (either visible or infrared) is used to align devices on opposite sides of a substrate, FIG. 6A showing the mask aligner focused on the distal (lower) substrate surface and FIG. 6B showing focus on the proximate (upper) substrate surface. To enable alignment of devices on opposing sides of a substrate which transmits only invisible infrared light (e.g., silicon or germanium substrates), the first mask aligner may be equipped with an infrared source and camera. The infrared source and camera enable the user to "see" through the substrate and alternatingly focus on the alignment marks positioned on both sides of the substrate by translating a microscope perpendicular to the substrate surface. However, to focus the microscope on the distal surface of the substrate, the working distance of the microscope objective must be greater than the thickness of the substrate and mask plate combined.

More specifically, the microscope objective 61 of the mask aligner is positioned above the mask 62 and substrate 63. The mask pattern 65 is positioned on the lower surface of the mask 62 and in contact with the photoresist coated on top of substrate 63. An alignment mark 64 has been previously etched into the lower surface of a substrate.

The mask aligner is designed to align an alignment mark 65 of mask 62 with the alignment mark 64 positioned on the lower opposing surface of substrate 63, so that the mask pattern can be transferred into the photoresist on the top surface of substrate 63. To achieve alignment, the microscope objective 61 of the mask aligner is alternatingly focused on the top and bottom alignment marks 64 and 65 by translating the microscope objective 61 perpendicular to the surface of substrate 63.

The distance that the microscope objective must be translated is equivalent to the thickness W1 of the substrate 63 divided by the index of refraction n of the substrate 63 (e.g., n=1.5). For instance, the microscope is first centered on the lower alignment mark 64, often with the aid of a reticle or cross hair in the eyepiece of the microscope. The microscope is then vertically translated to focus on the top or photoresist surface of the substrate, where the mask is moved laterally to center its alignment mark in the field of view of the microscope. After exposing and developing the photoresist, the substrate is etched to transfer the pattern from the photoresist into the surface of the substrate.

The second system for identifying aligned portions onto opposing substrate surfaces is described hereinafter with respect to FIGS. 7A–10. Before describing the processes used to identify those aligned portions, detailed descriptions of the mask aligner, substrate and mask used in the second system are provided.

The Mask Aligner

FIGS. 7A–7B illustrate an exemplary mask aligner in accordance with a first embodiment of the present invention. The mask aligner of FIGS. 7A–7B includes a projection eyepiece 230 and a microscope body 240. The projection eyepiece 230 shown in FIGS. 7A–7B is similar to that typically used in autocollimation telescopes.

The projection eyepiece 230 contains a visible or infrared source 231 which illuminates a source reticle 232. An image of the source reticle 232 is projected down the microscope body 240 by beam splitter 233 and relay lens 241. Detection device 234 is typically either a visible or infrared camera focused on reticle 235. However, detection device 234 may be a conventional microscope eyepiece for human visual operation.

In the projection eyepiece 230, reticles 232 and 235 are aligned with respect to each other such that their positions are mirror images of each other about the reflecting plane of beam splitter 233. In other words, if an observer were to look back into the eyepiece from the right (e.g. from position 241), the observer would observe the two reticles 232 and 235 superimposed on top of each other. Image plane 250 is therefore simultaneously a conjugate image plane of both reticles 232 and 235.

Microscope body 240 includes an arrangement of lenses, including a microscope objective 242 arranged to produce an image of the mask pattern (located at the interface between mask 220 and substrate 210) onto the image plane 250. Together with the projection eyepiece 230, the microscope body 240 also focuses light from source reticle 232 and forms an image of the source reticle 232 onto the photoresist-coated surface of substrate 210, which is also located at the interface of mask 220 and substrate 210. The four conjugate image-object planes of the system include; reticles 232 and 235, image plane 250, and the interface between mask 220 and substrate 210.

Generally, image plane 250 of microscope objective 242 is located inside the microscope body 240. For proper operation, the reticles 232 and 235 must be coincident with image plane 250, but the beam splitter 233 may prevent physical location of the reticles at image plane 250. In such a case, a relay lens 241 is preferably included as an attachment to the microscope body 240 (as shown) to reimage the reticles onto image plane 250 of microscope objective 242 with the proper magnification. The light returned from the substrate 210 produces an image at image plane 250 before being reimaged by relay lens 241 onto reticle 235. The displacement between the image formed at reticle 235 and the actual reticle 235 is used to determine alignment between the mask 220 and substrate 210.

The relay lens 241 may alternatively be included in the projection eyepiece 230 (not shown). Also, relay lens 241 can serve to remove aberrations produced by focusing light through beam splitter 233 if beam splitter 233 is a cube beam splitter.

In the preferred embodiment, the distance between lenses 241 and 242, as well as the specific optical power of relay lens 241, is defined by the specific optical and mechanical configuration of the mask aligner and the required magnification at camera 234. The specific optical prescription may therefore be determined by routine lens design or experimentation. Image plane 250 is generally located at a position corresponding to a reticle or cross hair in the conventional eyepiece of a microscope or mask aligner. Furthermore, the substrate 210 and mask 220 may be positioned precisely with respect to the microscope lens using well-established conventional means, such as those customarily used on conventional mask aligners.

Figure 10:
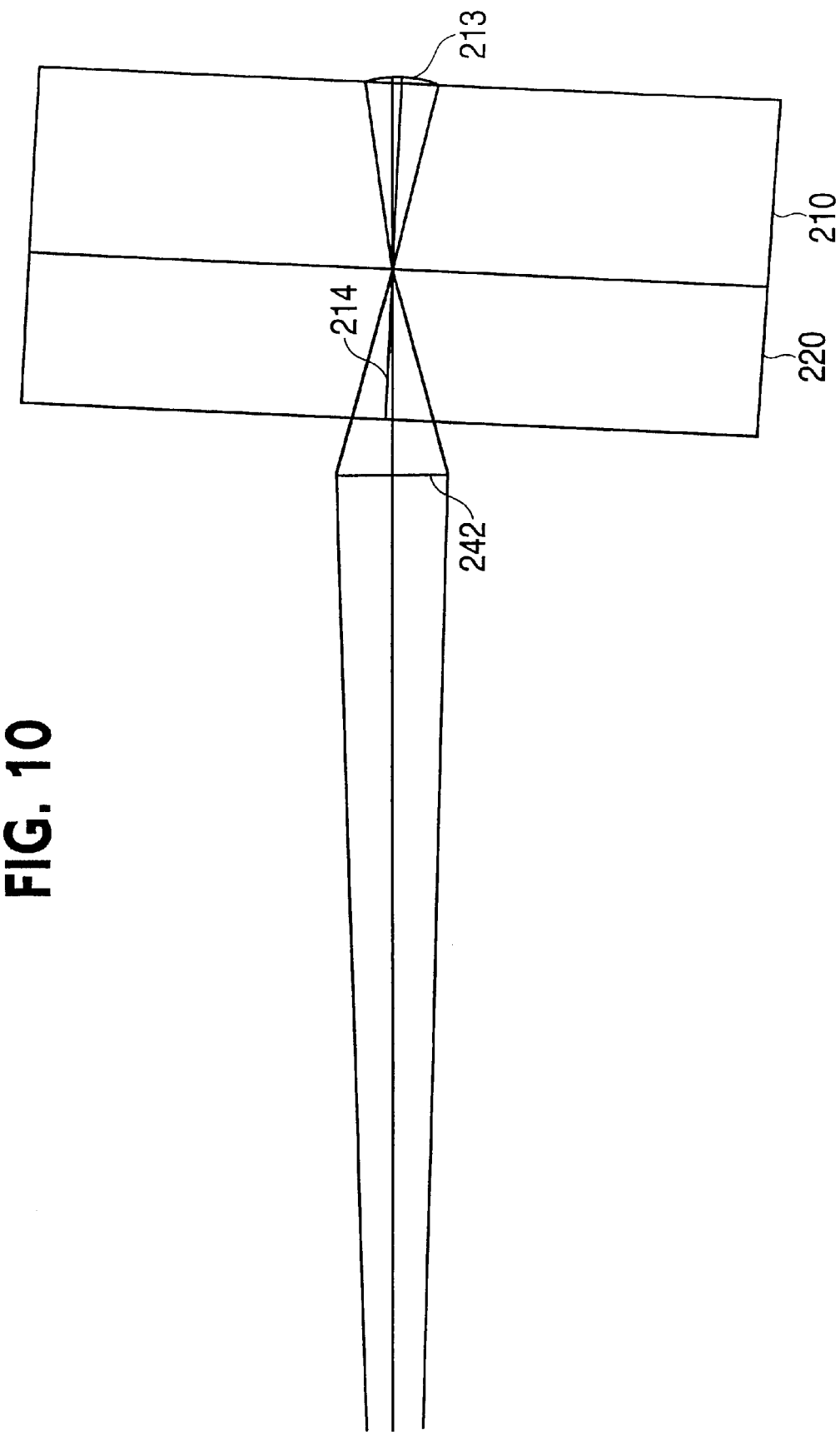
FIG. 10 illustrates the inconsequential effects of a tilt in the substrate surfaces with respect to the mask aligning system shown by FIGS. 7A–7C.

Thus, in the preferred embodiment, this invention requires only that the existing eyepiece or camera from the mask aligner be replaced with the projection eyepiece of FIG. 7A or FIG. 10. By adopting the unique design of the above-described projection eyepiece and by including specific optical devices on the substrate, existing commercial mask aligners can be modified to implement this invention.

The Substrate

The substrate is identified in FIGS. 7B and 7C by reference numeral 210. Substrate 210 is fabricated from a material that is transparent to the light used to project the reticle image onto the substrate. If the substrate is transmissive to infrared light but not visible light, such as silicon or germanium, then an infrared source and camera are used in the projection eyepiece. By contrast, for substrates which transmit visible light, such as fused silica, gallium phosphide or zinc selenide, a visible source and camera (or microscope eyepiece) are used in the projection eyepiece. Various other materials may also be used for the substrate, so long as they are optically transparent to either visible light or infrared light.

Substrate 210 has a first substrate surface 211 and an opposing second substrate surface 212. First substrate surface 211 is coated with photoresist 230 which contacts mask 220. The mask pattern lies on the surface of mask 220 that contacts the photoresist 230. The photoresist layer 230 between the mask pattern of mask 220 and first substrate surface of 211 ranges in thickness from less than one micron to several microns, depending on the application or device to be transferred into the substrate. At least one alignment mark and at least one reflective micro-optical device 213 (hereinafter a "micro-mirror") are fabricated onto the second substrate surface 212. Generally, more than one alignment mark and one micro-mirror are used in order to remove both rotational and translational alignment errors. Alignment marks may be positioned anywhere on the second substrate surface 212, but the position of the alignment marks must be precisely known relative to the position of the micro-mirrors 213 in order for the alignment marks to be used for subsequently fabricating micro-devices on the second substrate surface 212. Alternatively, if the micro-devices and the micro-mirrors 213 are simultaneously fabricated using the same mask 220, then the alignment marks 213 would not be necessary.

Micro-mirrors 213 are used to establish reference positions on the first substrate surface 211 that are precisely positioned with respect to reference positions on the second substrate surface 212. In the simplest embodiment, each micro-mirror 213 is a concave mirror with a radius of curvature equal to the thickness of the substrate 210 and with an optical axis 214 which is perpendicular to the surface of the substrate 210, as illustrated in FIG. 7C. In this embodiment, point P, which lies on the optical axis 214, is simultaneously a conjugate object and image point, and surface 211 is simultaneously a conjugate object and image plane. Therefore, in this embodiment, a point of light focused to the left of P on surface 211 will be imaged to the right of P on surface 211, and vice versa. Alternate embodiments include micro-mirrors 213 formed of reflective diffractive optical elements, diffraction gratings, or a complex holographic optical elements. However, in each of these embodiments, the micro-mirror 213 collects light from an image formed on the first substrate surface 211 near its optical axis 214, and focuses the light to form a second image on the first substrate surface 211. Thus, the micro-mirrors 213 are sensitive to the lateral position of the first image formed on the first substrate surface 211, such that a first image that is centered on the optical axis of the micro-mirror 213 will coincide with its reflected second image from the micro-mirror 213. Otherwise, when a first image is not centered on the optical axis of micro-mirror 213, a detectable lateral displacement will be observed between the first image and its reflected second image.

There are a number of different methods for fabricating the micro-mirrors and alignment marks on the second substrate surface 212, most all of which use some form of photolithography. The micro-mirrors 213 may be etched into the surface of the substrate 210, or they may be fabricated in a thin film or coating on the second substrate surface 212. Some of the methods for fabricating micro-optical devices are discussed in *Micro-optics* and *Lithography*, Maria and Stefan Kufner, VUB University Press, Brussels, Belgium, 1997.

The Mask

The mask is identified in FIGS. 7B and 7C by reference numeral 220. Mask 220 is preferably a gray scale mask which is capable of achieving one-step fabrication of the micro-optical device. However, other conventional masks such as chrome masks may be used. Mask 220 is placed in contact with the photoresist-coated substrate 210. The side of mask 220 in contact with the photoresist 230 contains the mask pattern to be transferred into the photoresist 230. The mask pattern contains alignment marks which are to be centered on the optical axes of the micro-mirrors 213. The mask aligner has devices, such as a micrometer adjustment, to precisely translate the mask 220 laterally with respect to the substrate 210. In addition to the alignment marks for centering the optical axes of the micro-mirrors 213, the mask 220 may contain patterns for other micro-devices, including additional alignment marks for subsequent fabrication processes.

Process for Aligning the Substrate and the Mask

Figure 8A:
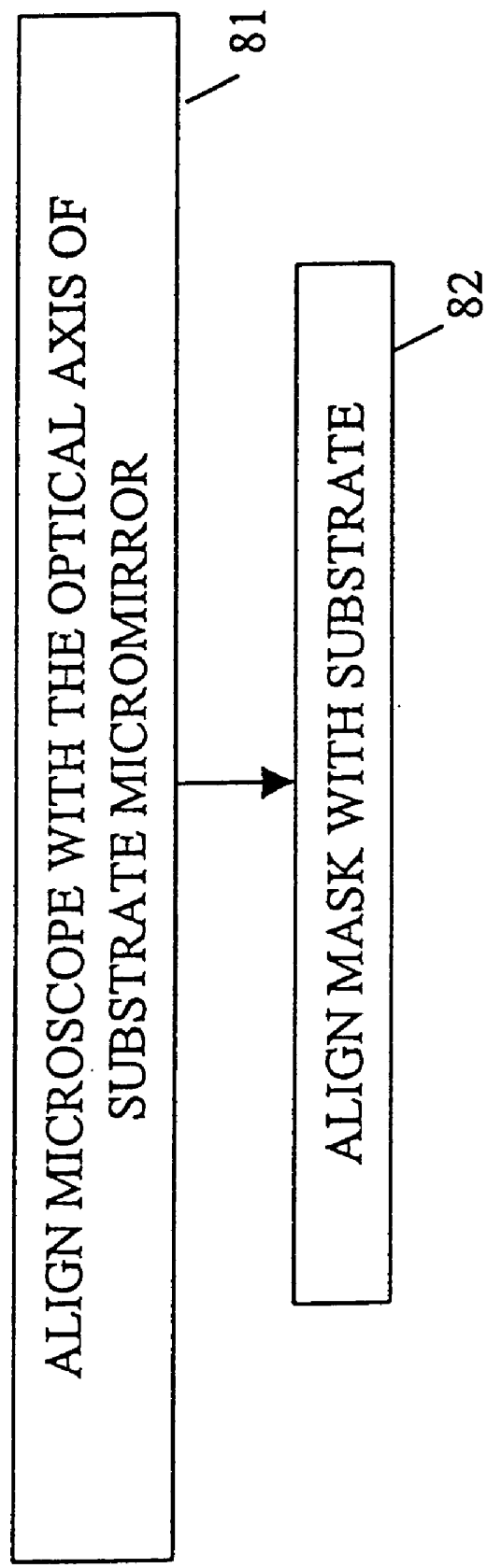
FIGS. 8A–8C illustrate a process performed by the system shown in FIGS. 7A–7C to identify portions of opposing substrate surfaces that are aligned.
Figure 8B:
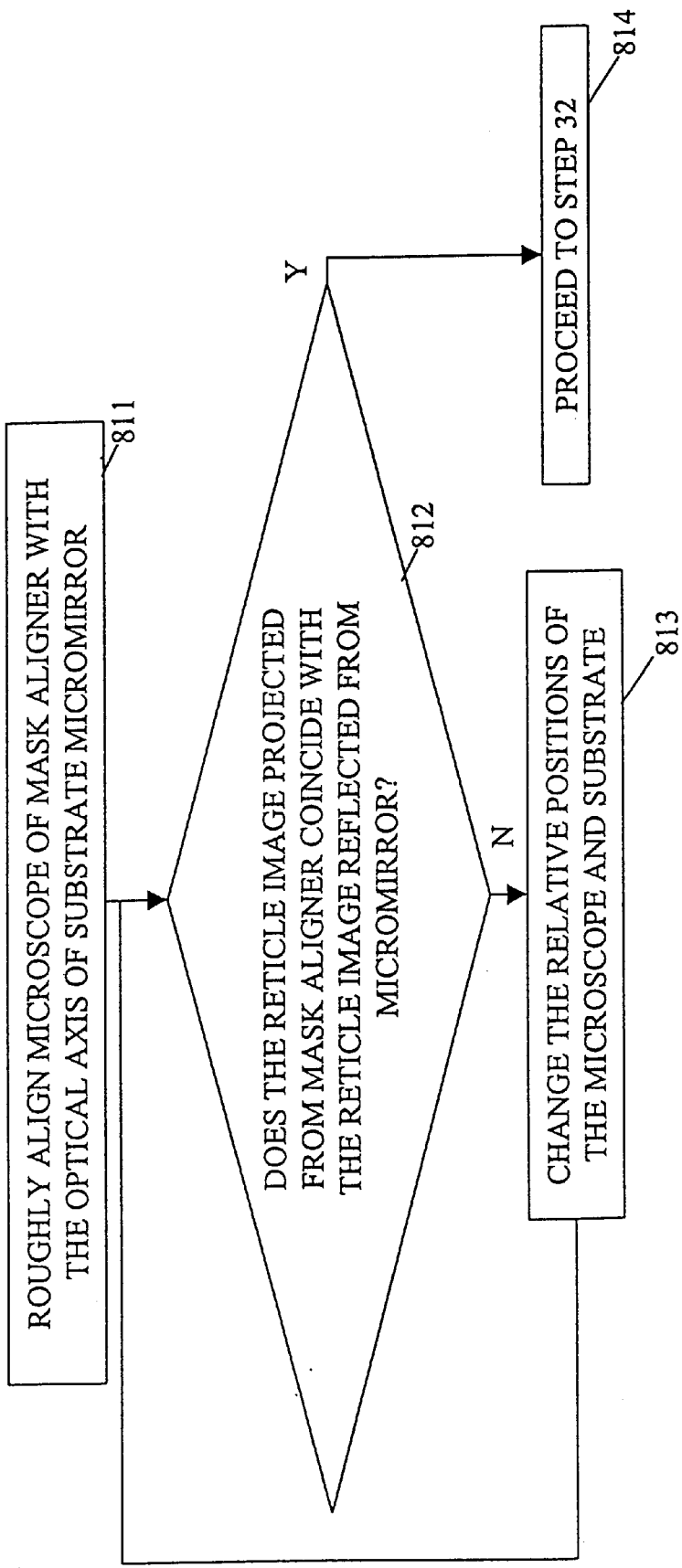
Figure 8C:
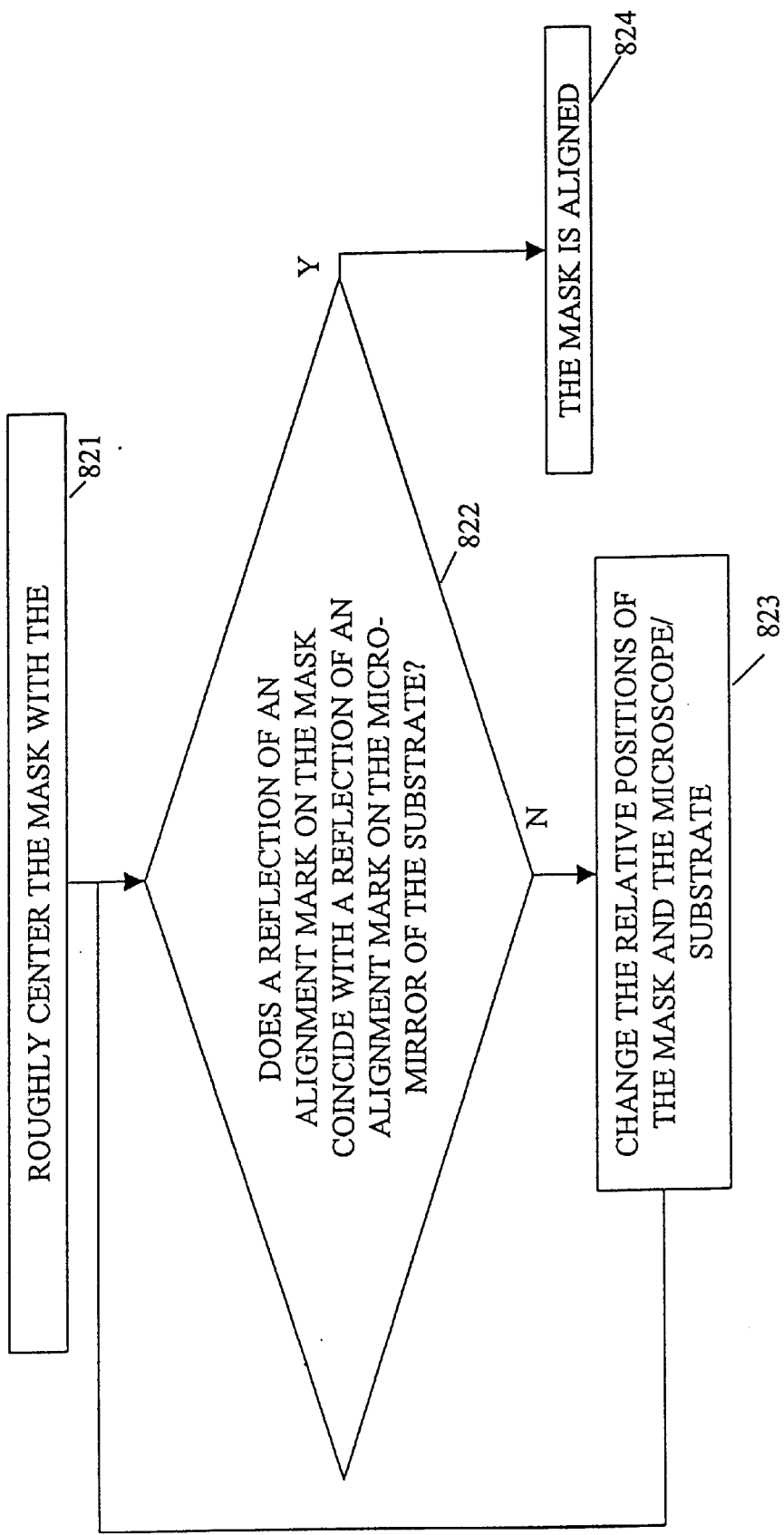

The flowcharts of FIGS. 8A–8C show steps in an exemplary process used to align a substrate and mask using a mask aligner having the above-described mask, substrate, and projection eyepiece. In step 81 of FIG. 8A, the cross hair or reticle of the mask aligner microscope is aligned with the optical axis of one of the micro-mirror devices positioned on the distal substrate surface. In this step, the relative positions of the microscope and substrate are changed until coincidence is achieved between the two images of the reticle at image plane 250, indicating alignment of the microscope with the optical axis of the target micro-mirror device on the substrate. Once the microscope is aligned with the optical axis of the micro-mirror device, an alignment mark on the mask is brought into coincidence with the microscope reticle in step 82, thereby aligning the mask with the substrate.

More specifically, FIG. 8B shows steps in an exemplary process for aligning the microscope with the optical axis of a substrate micro-mirror according to step 811 of FIG. 8A, and FIG. 8B shows steps in an exemplary process for aligning the mask with the substrate according to step 82 of FIG. 8A. The mask holder and substrate chuck on most all commercial mask aligners are generally able to roughly align the mask with the substrate within a tolerance of better than 1 mm. Therefore, the optical axis of the micro-mirrors will be within the vicinity (<1 mm) of the corresponding alignment marks on the mask, which are easily found under low power magnification of the microscope. If the substrate is thin enough, the user will also see a blurred outline of the micro-mirror which can be used to help align the microscope on the optical axis of the micro-mirror device. The rough alignment achieved by this method is generally sufficient to detect reflected light from the micro-mirror.

In step 811 of FIG. 8B, the microscope of the mask aligner is roughly aligned with the micro-mirror of the substrate. In step 812, the reticle image projected from the mask aligner is compared with the reticle image reflected from the micro-mirror on image plane 250. If the images coincide, the microscope is deemed to be aligned with the optical axis of the substrate micro-mirror, and the process proceeds to step 82 for alignment of the mask with the substrate. By contrast, if the images do not coincide, the relative positions of the microscope and substrate are changed in step 813, and the process is returned to step 812 for an updated comparison of the images. Micro-mirror devices are generally used to change the relative positions of the microscope or the substrate chuck.

In step 821 of FIG. 8C, the mask is roughly aligned with the substrate. The reflection of an alignment mark on the mask is then compared with the reflection of an alignment mark at the micro-mirror of the substrate in step 822. If the alignment marks are determined to coincide in step 822, the mask and substrate are deemed aligned in step 823. However, if the alignment marks are not determined to coincide in step 822, the relative positions of the mask and microscope/substrate are changed in step 824, and the process is returned to step 822 to perform an updated comparison of the alignment marks.

The processes described with respect to FIGS. 8A–8C can be repeated for at least two widely separated micro-mirrors on the substrate in order to remove both translational and rotational errors between the mask and substrate.

Figure 9A:
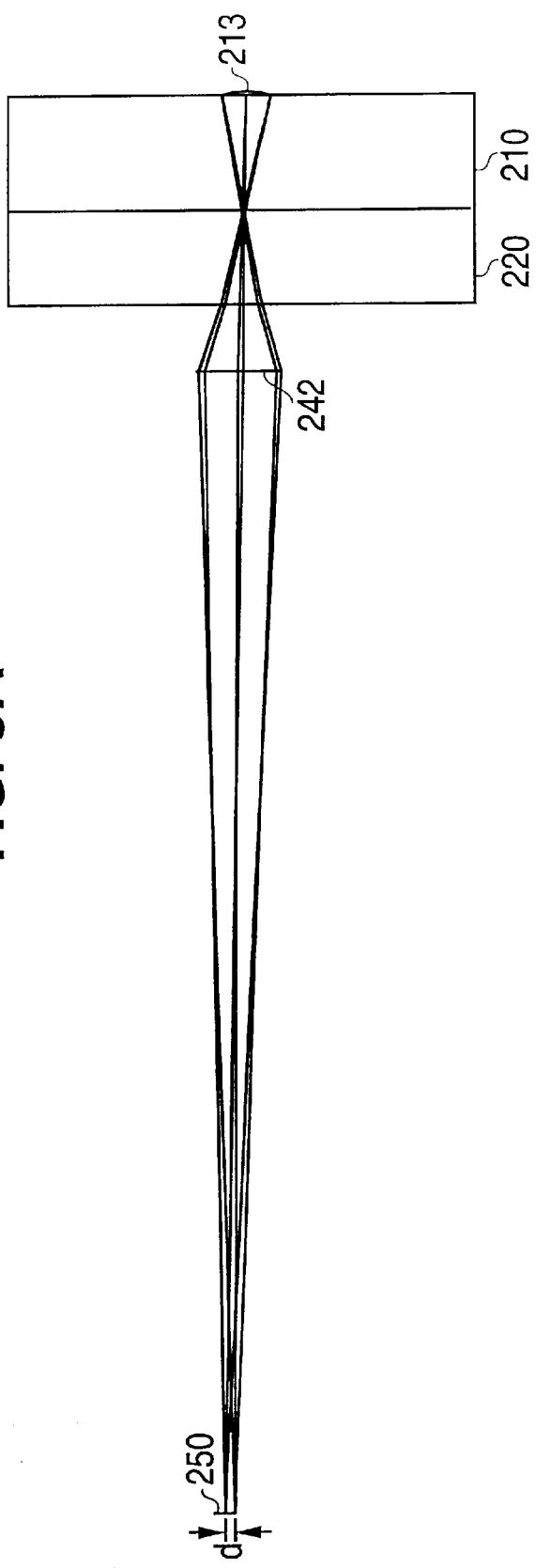
FIGS. 9A–9B illustrate the lateral displacement between two images of a retical of the system shown by FIGS. 7A–7C when patterns on opposite sides of the substrate are misaligned.
Figure 9B:
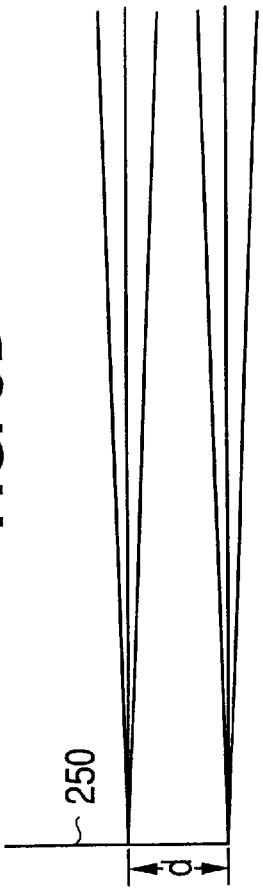

FIGS. 9A–9B illustrate the lateral displacement (d) of the two images at image plane 250 when microscope objective 242 is not aligned with the optical axis of micro-mirror 213. The magnitude of the displacement is equal to twice the alignment error times the magnification of the objective. Thus, using a 40×microscope objective, a 5-micron alignment error will result in a 400-micron displacement between the two reticle images.

FIG. 10 illustrates an example of a substrate and mask tilted with respect to the microscope, where the degree of the tilt is exaggerated for clarity. In FIG. 10, microscope objective 242 is focused on the optical axis 214 of the micro-mirror 213 at the conjugate object and image planes of the micro-mirror (located at the interface between mask 220 and substrate 210). As shown, no displacement occurs between the two images at image plane 250 and no misalignment is detected as a result of the tilt. From this example, one of ordinary skill will appreciate that the system's capability to perform the top-to-bottom alignment is not affected by the perpendicularity of the microscope with respect to the substrate surface. Rather, alignment can be successfully achieved by the present invention so long as the microscope objective is focused on the optical axis of the micro-mirror at the conjugate object and image planes of the micro-mirror.

In addition, one method of improving manufacturability is to minimize the surface sag of each surface—the variance between valleys on that single surface along a plane orthogonal to the substrate surface prior to shaping. Specifically, surface sag is defined by the following relationship:

$$sag \approx \frac{D}{8(n-1)(F)},$$

where D is the lens diameter, n is the refractive index, and F is a lens parameter commonly known as the F number. However, it is difficult to decrease surface sag without experiencing undesirable consequences.

For instance, undesirable consequences follow from changing the diameter D of the lens to decrease the surface sag. Specifically, while decreases in diameter D cause desirable decreases in surface sag, they also decrease alignment tolerances since smaller diameter lenses must be positioned closer to the laser source. As such, decreases in lens diameter make assembly more difficult and increase cost.

Undesirable consequences also follow from changing the F number of the lens to decrease the surface sag. Specifically, while increases in the F number cause desirable decreases in surface sag, they also reflect a decrease in the ability of the lens surface to achieve correction or collimation of incident light. For laser sources that produce widely divergent laser beam outputs, such as a laser diode, increases in the F number are therefore not desirable.

Therefore, to minimize the surface sag without experiencing such undesirable consequences, the substrate of the present invention is fabricated with high index materials (GaP, $TiO_2$, $SrTiO_3$, Si, Ge, ZnSe, ZnS, InSb, InAs, YSZ, AlAs, $BaTiO_3$, AlN, BN, $CuGaS_2$, $BiSiO_{20}$, $Bi_{12}GeO_{20}$, AgCl, AgBr, AgI, $AgGaSe_2$, $AgGaS_2$, $Al_2O_3$, $LiTaO_3$, $KnbO_3$, KRS-5 (TlI), KRS-6 (TlCl), and TlBr). Gallium Phosphide (GaP) is particularly useful for forming the microlenses since it has an index of refraction of about 3.3 for red light. Its reactive ion etching chemistry is also well known. As shown in Equation 1, the refractive index n is inversely related to surface sag. Thus, the use of high index materials necessarily decreases the surface sag without affecting the lens diameter D or F number.

Conventionally, high index materials were not used for lens fabrication due primarily to their high cost, which is prohibitively high when fabricating macrolenses (approximately 5 mm in diameter or larger). However, in microlens fabrication, the cost of high index materials is not prohibitive due to numerous factors such as the microscopic size of the microlens element (e.g., generally less than a millimeter in diameter), and the use of a single microlens element which reduces materials and eliminates costs associated with alignment of multiple elements.

The high cost associated with fabrication via high index materials may be further minimized by using those high index materials only to fabricate the opposing end surfaces of the substrate where the lenses are formed.

While there have been illustrated and described what are at present considered to be preferred embodiments of the present invention, it will be understood by those skilled in the art that various changes and modifications may be made and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and drawings are regarded as including a variety of individually inventive concepts, some of which may lie partially or wholly outside the scope of some or all of the following claims. The fact that the Applicant has chosen the time of filing of the present application to restrict the claim scope of protection in accordance with the following claims is not to be taken as a disclaimer of alternative inventive concepts that are included in the contents of the application and that could be defined by claims differing in scope from the following claims, which different claims may be adopted subsequently during prosecution, for example, or for the purposes of a continuation or divisional application.

What is claimed is:

1. A method of manufacturing a single microlens structure having two anamorphic microlens structures positioned on opposing surfaces, comprising:
   identifying aligned portions on opposing surfaces of a substrate, including the substeps:
      focusing a first image on a first position of a first substrate surface, and
      determining whether the first position is aligned with a second position on an opposing second substrate surface based on a second image formed based on light from a micro-optical device that is located on the second substrate surface for collecting light from the first image focused thereon; and
   forming microlenses on each of the aligned portions of the opposing substrate surfaces identified.

2. The method of manufacturing a single microlens structure of claim 1, wherein the microlenses are each formed based on patterns applied using at least one gray scale mask.

3. The method of manufacturing the single microlens structure of claim 2, wherein the microlenses are each formed by reactive ion etching the aligned portions of the substrate surface based on the patterns applied using the gray scale masks.

4. The method of manufacturing the single microlens structure of claim 1, wherein the microlenses are formed of a high index material.

5. The method of manufacturing the single microlens structure of claim 4, wherein the high index material is one of GaP, $TiO_2$, $SrTiO_3$, Si, Ge, ZnSe, ZnS, InSb, InAs, YSZ, AlAs, $BaTiO_3$, AlN, BN, $CuGaS_2$, $BiSiO_{20}$, $Bi_{12}GeO_{20}$, AgCl, AgBr, AgI, $AgGaSe_2$, $AgGaS_2$, $Al_2O_3$, $LiTaO_3$, $KnbO_3$, KRS-5 (TlI), KRS-6 (TlCl), and TlBr.

6. The method of manufacturing the single microlens structure of claim 4, wherein the high index material is GaP.

7. A single microlens structure having two anamorphic microlens structures positioned on opposing surfaces of a single element, the structure being manufactured by a process comprising:
   identifying aligned portions on opposing surfaces of a substrate, including the substeps:
      focusing a first image on a first position of a first substrate surface, and
      determining whether the first position is aligned with a second position on an opposing second substrate surface based on a second image formed based on light from a micro-optical device that is located on the second substrate surface for collecting light from the first image focused thereon; and
   forming microlenses on each of the aligned portions of the opposing substrate surfaces identified.

8. The structure of claims 7, wherein the process used to manufacture the single microlens structure includes forming each of the microlenses based on patterns applied using at least one gray scale mask.

9. The structure of claim 8, wherein the process used to manufacture the single microlens structure includes forming each of the microlenses by reactive ion etching the aligned portions of the substrate surface based on the patterns applied using the gray scale masks.

10. The structure of claim 7, wherein the process used to manufacture single microlens structure includes forming the microlenses of a high index material.

11. The structure of claim 10, wherein the high index material is formed from one of GaP, $TiO_2$, $SrTiO_3$, Si, Ge, ZnSe, ZnS, InSb, InAs, YSZ, AlAs, $BaTiO_3$, AlN, BN, $CuGaS_2$, $BiSiO_{20}$, $Bi_{12}GeO_{20}$, AgCl, AgBr, AgI, $AgGaSe_2$, $AgGaS_2$, $Al_2O_3$, $LiTaO_3$, $KnbO_3$, KRS-5 (TlI), KRS-6 (TlCl), and TlBr.

12. The structure of claim 10, wherein the high index material is formed of GaP.

13. A method of manufacturing a single microlens having two microlens structures positioned on opposing surfaces, said method comprising the steps:

aligning at least two portions, each of said at least two portions being on opposing surfaces of a substrate, said aligning step including the sub-steps:

forming a first image on a first position near a first surface of the substrate, and forming a second image on a second position near the first surface of the substrate using a micro-optical device that is located on a second surface of the substrate; and providing a micro-structure on each of said at least two aligned portions of the opposing surfaces of the substrate.

14. The method of claim 13, wherein said providing step is by fabricating at least one of the micro-structures.

15. The method of claim 13, wherein the micro-optical device is one of reflective non-diffractive element, reflective diffractive element, diffractive grating element, and holographic element.

16. The method of claim 13, further comprising: fabricating the micro-optical device onto the second surface of the substrate.

17. The method of claim 16, wherein said fabricated micro-optical device forms a second image onto a first image when the latter is located both near the first surface of the substrate and near the optical axis of said micro-optical device.

18. The method of claim 17, wherein the micro-structures are provided based on patterns applied using at least one gray scale mask.

19. The method of claim 17, wherein the micro-structures are provided by reactive ion etching the aligned portions of the substrate.

20. The method of claim 17, wherein at least one of the provided microstructures is an anamorphic microlens structures.

21. The method of claim 17, wherein the microlens is formed of a high index material.

22. The method of claim 21, wherein the high index material is one of GaP, $TiO_2$, $SrTiSO_3$, Si, Ge, ZnSe, ZnS, InSb, InAs and YSZ.

23. The method of claim 21, wherein the high index material is GaP.

24. The method of claim 13, wherein said aligning step further includes moving the first position of the first image with respect to the first surface so as to coincide the first image with the second image.

* * * * *